US011346539B1

United States Patent
Ali et al.

(10) Patent No.: US 11,346,539 B1
(45) Date of Patent: May 31, 2022

(54) ACTIVE THERMAL-CONTROL OF A FLOODLIGHT AND ASSOCIATED FLOODLIGHTS

(71) Applicant: Google LLC, Mountain View, CA (US)

(72) Inventors: Ihab A. Ali, Cupertino, CA (US); Duen Hsing Hsieh, Tapiei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/178,804

(22) Filed: Feb. 18, 2021

(51) Int. Cl.
| | |
|---|---|
| F21V 29/70 | (2015.01) |
| F21V 33/00 | (2006.01) |
| F21V 29/87 | (2015.01) |
| H05B 45/18 | (2020.01) |
| F21V 23/02 | (2006.01) |
| F21Y 115/10 | (2016.01) |

(52) U.S. Cl.
CPC .............. *F21V 29/70* (2015.01); *F21V 23/02* (2013.01); *F21V 29/87* (2015.01); *F21V 33/0052* (2013.01); *H05B 45/18* (2020.01); *F21Y 2115/10* (2016.08)

(58) Field of Classification Search
CPC ...... F21V 29/70; F21V 23/02; F21V 33/0052; F21V 29/87; F21V 29/74; F21V 29/763; F21V 23/0442; F21V 29/83; H05B 45/18; F21Y 2115/10; F21S 8/003; F21S 8/033; F21S 8/085
See application file for complete search history.

(56) References Cited

U.S. PATENT DOCUMENTS

| | | | | |
|---|---|---|---|---|
| 8,492,961 | B2* | 7/2013 | Zeng | ........................ F21V 29/70 |
| | | | | 313/46 |
| 9,839,088 | B1* | 12/2017 | Deaton | ................... H05B 45/18 |
| 10,529,206 | B2 | 1/2020 | Sacre et al. | |
| 10,584,863 | B1* | 3/2020 | Mittal | ................. F21V 19/0055 |
| 11,002,426 | B2* | 5/2021 | Liu | ....................... F21V 29/508 |
| 2010/0039511 | A1 | 2/2010 | Wang | |

(Continued)

FOREIGN PATENT DOCUMENTS

| | | |
|---|---|---|
| CN | 106838725 | 6/2017 |
| DE | 202020106405 | 11/2020 |
| JP | 6321101 | 3/2017 |

OTHER PUBLICATIONS

"Aluminum LED Heatsink", Accessed online at: https://www.ecvv.com/product/2661165.html?s=p-paying-member on Oct. 22, 2020, 3 pages.

(Continued)

*Primary Examiner* — Peggy A Neils
(74) *Attorney, Agent, or Firm* — Colby Nipper PLLC

(57) ABSTRACT

This document describes techniques directed to active thermal-control of a floodlight and associated floodlights. As described, an example floodlight includes a first heat-transfer subsystem that uses a fully enclosed heat sink to transfer heat from an array of LEDs to a first housing component of the floodlight. The floodlight further includes a second heat-transfer subsystem to transfer heat from one or more PSUs to a second housing component of the floodlight. Described techniques include using thermistors located throughout the floodlight to actively monitor a temperature profile within the floodlight and, if one or more operating-temperature thresholds are violated, reducing power consumption within the floodlight.

20 Claims, 7 Drawing Sheets

(56) References Cited

U.S. PATENT DOCUMENTS

| | | | |
|---|---|---|---|
| 2012/0235579 A1* | 9/2012 | Chemel | F21S 2/005 |
| | | | 315/152 |
| 2015/0362172 A1* | 12/2015 | Gabriel | F21S 8/088 |
| | | | 348/151 |
| 2018/0013934 A1 | 1/2018 | Germe et al. | |
| 2018/0033273 A1 | 2/2018 | Siminoff et al. | |
| 2018/0292056 A1* | 10/2018 | Kim | F21S 8/086 |
| 2019/0017667 A1 | 1/2019 | Mitchell et al. | |
| 2020/0096842 A1 | 3/2020 | Ramones et al. | |

OTHER PUBLICATIONS

"China LED Heat Sink Aluminium", Accessed online at: https://www.pinterest.com/pin/468022586255226549/?lp=true&nic_v2=1a2S4dfl7 on Oct. 22, 2020, 1 page.

Sung, "Styron to Participate at LED China in Guangzhou, Showcasing Quality Polycarbonate Resins for Lighting Applications", Accessed online at: https://investor.trinseo.com/investor-relations/news/news-details/2013/Styron-to-Participate-at-LED-China-in-Guangzhou-Showcasing-Quality-Polycarbonate-Resins-for-Lighting-Applications/default.aspx on Oct. 22, 2020, 2 pages.

"International Search Report and Written Opinion", Application No. PCT/US2021/044221, dated Nov. 18, 2021, 11 pages.

"International Search Report and Written Opinion", Application No. PCT/US2021/044212, dated Nov. 2, 2021, 13 pages.

* cited by examiner

ACTIVE THERMAL-CONTROL OF A FLOODLIGHT AND ASSOCIATED FLOODLIGHTS

BACKGROUND

Floodlights are becoming a popular addition to home security systems. A floodlight today may include multiple heat-generating subsystems, such as a power supply unit (PSU) subsystem that contains multiple PSUs and one or more lighting subsystems that each include an array of light-emitting diodes (LEDs). In total, the multiple heat-generating subsystems may generate a heat load of up to 25 Watts (W) for dissipation to a surrounding environment.

Along with the PSUs and the LEDs, the floodlight may include additional devices that are temperature sensitive. For instance, the floodlight may also temperature-sensitive devices such as a passive infrared (PIR) sensor to detect motion, an imager sensor to record images, and a microcontroller (MCU) that controls the floodlight. These devices, along with the PSUs and the LEDs, may have respective, allowable operating-temperature thresholds.

To maintain its temperature profile within the allowable operating thresholds, the floodlight may include a heat-transfer system to transfer heat from the PSUs and the array of LEDs to housing components for eventual dissipation to a surrounding environment. For example, the floodlight may include a heat sink to radiate and/or convect heat from the LEDs. However, the heat sink may have an exposed, polished surface that has poor radiation and/or poor convection heat-transfer characteristics. Furthermore, exposure of the heat sink to the surrounding environment may create a safety risk, providing an easily accessible region of the heat sink that is susceptible to exceeding a prescribed touch-temperature limit Although some surface treatments may improve the poor heat-transfer characteristics of the heat sink, such surface treatments may add expense to the heat sink and fail to address the safety risk.

In some instances, the floodlight may also include one or more air pockets that surround the PSUs. However, due to physical properties of the air, convection heat-transfer from the PSUs may be impeded.

The heat-transfer system, as described above, is neither effective nor efficient in maintaining temperatures of devices of the floodlight within allowable operating-temperature thresholds. Furthermore, the heat-transfer system may present an ergonomic safety risk.

SUMMARY

This document describes techniques directed to active thermal-control of a floodlight and associated floodlights. As described, an example floodlight includes a first heat-transfer subsystem that uses a fully enclosed heat sink to transfer heat from an array of LEDs to a first housing component of the floodlight. The floodlight further includes a second heat-transfer subsystem to transfer heat from one or more PSUs to a second housing component of the floodlight. Described techniques include using thermistors located throughout the floodlight to actively monitor a temperature profile within the floodlight and, if one or more operating-temperature thresholds are violated, reducing power consumption within the floodlight.

In some aspects, a floodlight is described. The floodlight includes a first housing component that is shaped like a substantially-cylindrical shell with a rounded cap about a central axis. The floodlight further includes an array of LEDs mounted to a printed circuit board (PCB) that is internal to the housing component and within a planar area that is generally orthogonal to the central axis.

A heat-transfer subsystem of the floodlight is configured to transfer heat from the array of LEDs to the housing component for external dissipation. The heat-transfer subsystem, located within the housing component, includes a heat sink shaped as a second substantially-cylindrical shell with a rounded cap about the central axis. The heat sink fits within the housing component and has an outer surface that is in physical contact with an inner surface of the housing component. A thermal interface material (TIM) is located between the PCB and a pedestal of the heat sink.

In other aspects, a floodlight is described. The floodlight includes an array of LEDs, a first power supply, a first heat-transfer subsystem, a PIR sensor, a second power supply, and a second heat-transfer subsystem. The floodlight further includes one or more thermistors, an MCU, and a computer-readable storage medium (CRM) storing instructions of a thermal-control manager application.

Upon execution by the MCU, the thermal-control manager application directs the floodlight to perform operations that include determining, based on temperature readings from the one or more thermistors, a temperature profile of the floodlight. Based on the temperature profile and heat-transfer characteristics of the first and second heat-transfer subsystems, the thermal-control manager application may adjust power supplied to the array of LEDs and/or the power supplied to the PIR sensor. Adjusting the power is effective to concurrently maintain (i) a first temperature of a first thermal zone, including the first power supply, at or below a first prescribed temperature threshold and (ii) a second temperature of a second thermal zone that includes the second power supply at or below a second prescribed temperature threshold.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor limit the scope of the claimed subject matter.

BRIEF DESCRIPTION OF THE DRAWINGS

The details of one or more aspects of an active thermal-control system for a floodlight and associated floodlights are described below. The use of the same reference numbers in different instances in the description and the figures indicate similar elements.

DETAILED DESCRIPTION

Overview

Figure 1:
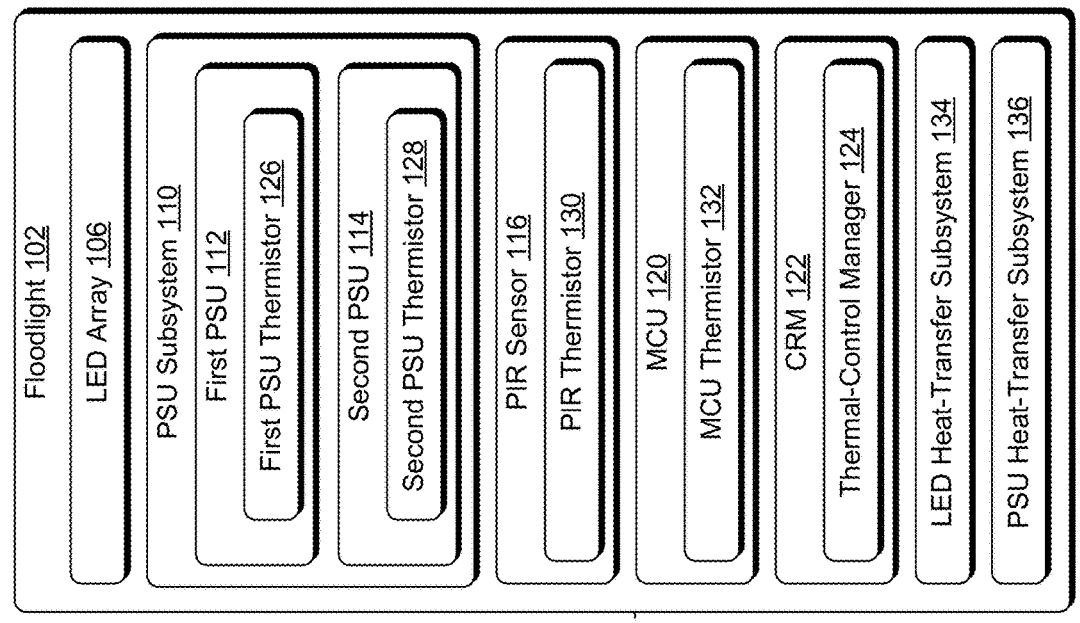
FIG. 1 illustrates an example operating environment in which aspects of an active thermal-control system for a floodlight can be implemented.
Figure 1:
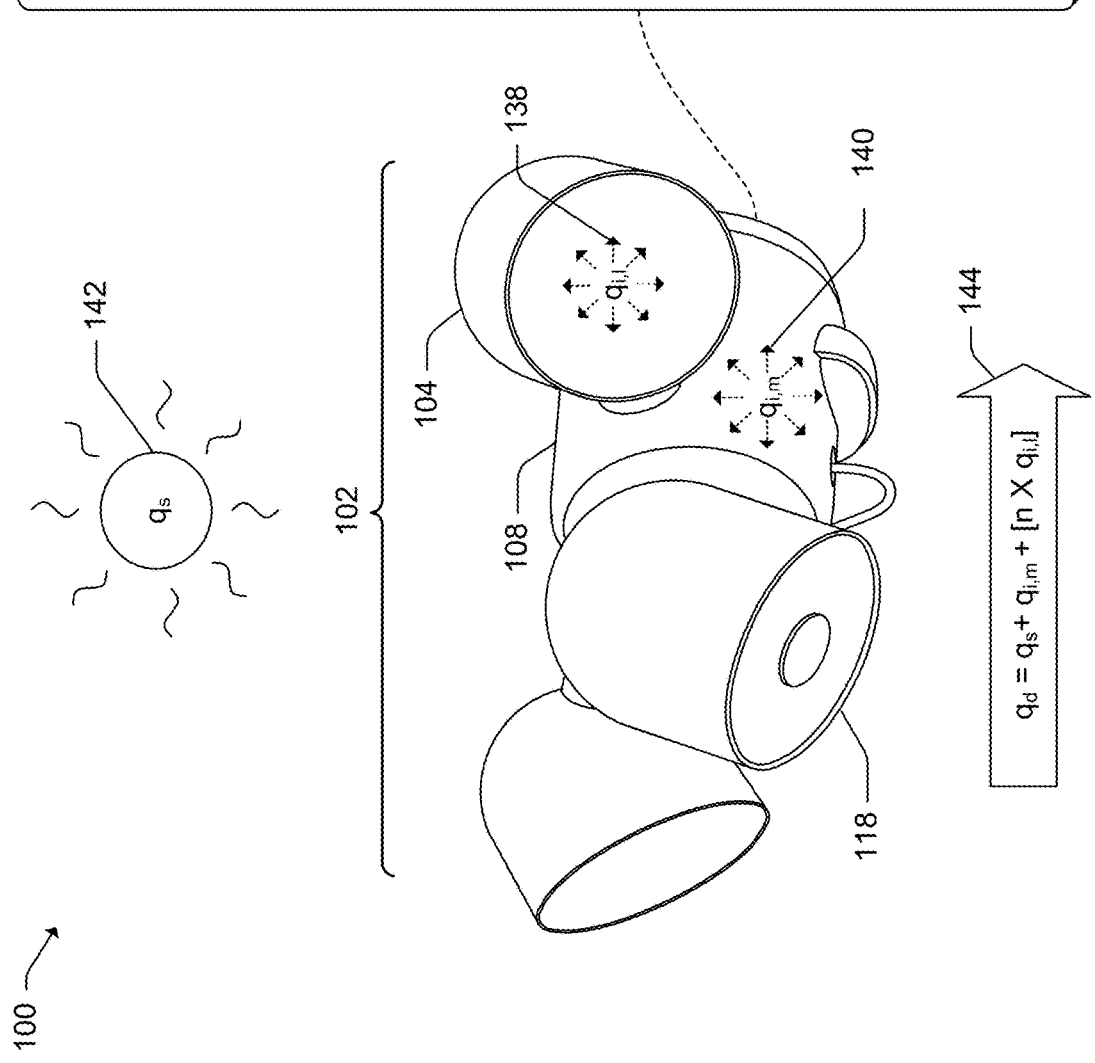

This document describes techniques directed to active thermal-control of a floodlight and associated floodlights. As described, an example floodlight includes a first heat-transfer subsystem that uses a fully enclosed heat sink to transfer heat from an array of LEDs to a first housing component of the floodlight. The floodlight further includes a second heat-transfer subsystem to transfer heat from one or more PSUs to a second housing component of the floodlight. Described techniques include using thermistors located throughout the floodlight to actively monitor a temperature profile within the floodlight and, if one or more operating-temperature thresholds are violated, reduce power consumption within the floodlight.

While features and concepts of the described thermal-control system can be implemented in any number of different environments and devices, aspects are described in the context of the descriptions and examples below.

Heat transfer, in general, is energy that is in transit due to a temperature difference. If one or more temperature differences exist across components of a system, such as the floodlight, heat (e.g., energy in Joules (J)) will transfer from higher-temperature zones to lower-temperature zones to minimize the temperature differences. There are several mechanisms for heat transfer across the components of a system to minimize temperature differences, including convection, radiation, and conduction.

Convection, or heat transfer from a surface due to movement of molecules within fluids such as gases and liquids, can be quantified by equation 1 below:

$$q_{conv} = hA(T_s - T_\infty) \qquad (1)$$

For equation 1, a $q_{conv}$ represents a rate of heat transfer from a surface through convection (e.g., in J per second or Watts (W)), h represents a convection heat transfer coefficient (e.g., in Watts per meter squared (W/m$^2$)), $T_s$ represents a temperature of a surface (e.g., in Kelvin (K) or degrees Celsius (° C.)), and $T_\infty$ represents a temperature of a fluid (e.g., in K or ° C.) to which the surface is exposed. The term A represents the area of a surface (e.g., in m$^2$).

Radiation, or heat transfer from a surface through electromagnetic radiation, can be quantified by equation 2 below:

$$q_{rad} = \varepsilon A \sigma (T_s^4 - T_{surr}^4) \qquad (2)$$

For equation 2, $q_{rad}$ represents a rate of heat transfer through radiation (e.g., in W), ε represents emissivity (dimensionless), σ represents the Stefen-Boltzmann constant (e.g., σ=5.67×10$^{-8}$ W/(m$^2$·K$^4$)) $T_s$ represents a temperature of a surface (e.g., in K or ° C.), and $T_{surr}$ represents a temperature of surroundings of the surface (e.g., K or ° C.). The term A represents an area of the surface (e.g., in m$^2$).

Conduction, or heat transfer through a solid body through atomic and molecular activity, can be quantified by equation 3 below:

$$q_{cond} = -kA\frac{dT}{dx} \qquad (3)$$

For equation 3, $q_{cond}$ represents a rate of heat transfer in a solid material through conduction (e.g., in W), k represents a thermal conductivity of the solid material (e.g., in W/(m·K)), and dT/dx represents a temperature gradient through the solid material (e.g., in K/m or ° C./m). The term A represents a cross-sectional area of the solid material (e.g., in m$^2$).

For a floodlight, heat transfer between components may occur using one or more of the heat transfer mechanisms described above. In general, and in accordance with equations (1) and (2), heat transfer can be varied by increasing or decreasing surface areas for convection and/or radiation within the floodlight (e.g., increasing or decreasing surface areas of a heat sink). Furthermore, and in accordance with equation (3), heat transfer can be varied by choosing one or more materials that interface with heat-generating devices of the floodlight and have relatively high thermal conductivity.

Through careful design of heat-transfer subsystems in accordance with equations (1)-(3) above, an active thermal-control system of the floodlight can be tailored to function to a desired heat-transfer performance level. Instrumenting thermal zones of the floodlight with one or more temperature-sensing devices (e.g., thermistors) may enable the thermal-control system to be the active thermal-control system. Such an active thermal-control system may, for different heat loading conditions, concurrently maintain the thermal zones of the floodlight at or below different, respective prescribed temperature thresholds.

Example Operating Environment and System

FIG. 1 illustrates an example operating environment 100 having a floodlight 102. The floodlight 102 may include an LED housing component 104 that houses an LED array 106 (e.g., a light source). The LED housing component 104 may be generally shaped as a substantially-cylindrical shell with a rounded cap. In this way, the LED housing component 104 forms a general cup shape with an open end and an opposing, rounded, closed end. In some aspects, the LED housing component 104 includes a tapering diameter that tapers from the open end toward the closed end. The floodlight 102 may also include a main housing component 108 that houses a PSU subsystem 110. The PSU subsystem 110 may include a first PSU 112 (e.g., a power source for the LED array 106 that generates approximately 10 W for the LED array 106) and a second PSU 114 (e.g., another power source that generates approximately 5 W for sensors of the floodlight 102). In some instances, power supplied by the first PSU 112 may scale with additional combinations of the LED housing component 104 and the LED array 106. The floodlight 102 may also include an additional housing component 118 for other features such as a camera, a speaker, and so on.

In some instances, housing components of the floodlight 102 (e.g., the LED housing component 104, the main housing component 108, the additional housing 118) may include a plastic material. As an example, the plastic material may be a post-consumer resin (PCR) material that is chosen for sustainability purposes.

The floodlight 102 also includes an MCU 120 having logic circuitry that may execute instructions to operate the floodlight 102. The floodlight 102 also includes a computer-readable storage medium (CRM) 122. In the context of this discussion, the CRM 122 of the floodlight 102 is a hardware-based storage medium, which does not include transitory signals or carrier waves. As an example, the CRM 122 may include one or more of a read-only memory (ROM), a Flash memory, a dynamic random-access memory (DRAM), a static random-access memory (SRAM), a disk drive, a magnetic medium, and so on.

The CRM 122 includes executable instructions to implement a thermal-control manager application 124. Upon execution by the MCU 120, the thermal-control manager application 124 may direct the floodlight 102 to perform operations to actively control thermal performance of the floodlight 102 as described in further detail below.

To support the thermal-control manager application 124, the floodlight 102 includes instrumentation that measures temperatures (e.g., in Celsius (° C.)) of different thermal zones across the floodlight 102. The instrumentation includes a first PSU thermistor 126 configured to, for example, measure a first temperature of a first thermal zone that includes the first PSU 112. The instrumentation also includes a second PSU thermistor 128 configured to, for example, measure a second temperature of a second thermal zone that includes the second PSU 114. In addition, the instrumentation may include a PIR thermistor 130 configured to, for example, measure a third temperature of a third thermal zone that includes the PIR sensor 116. In aspects, the instrumentation may include an MCU thermistor 132 configured to, for example, measure a fourth temperature of a fourth thermal zone that includes the MCU 120.

The instrumentation may, in some instances, include a voltmeter that is part of the MCU 120 and that measures a forward voltage of the LED array 106. Using the measured forward voltage, the thermal-control manager application 124 may be able to derive a temperature of the LED array 106 (e.g., a fifth thermal zone that includes the LED array 106).

The floodlight 102 further includes an LED heat-transfer subsystem 134 and a PSU heat-transfer subsystem 136. Each of the heat-transfer subsystems 134 and 136 may include one or more conduction, convection, and/or radiation heat-transfer mechanisms to transfer heat to respective housings of the floodlight 102.

As a first example, the LED heat-transfer subsystem 134 may include a heat sink to transfer a first heat load 138 (e.g., an internal heat load originating from the LED array 106) at a first rate (e.g., $q_{i,l}$) to the LED housing component 104. As a second example, the PSU heat-transfer subsystem 136 may include a glue potting-material that envelops the first PSU 112 and/or the second PSU 114 to transfer a second heat load 140 (e.g., an internal heat load originating from first PSU 112 and/or the second PSU 114) at a second rate (e.g., $q_{i,m}$) to the main housing component 108. Furthermore, both the LED heat-transfer subsystem 134 and the PSU heat-transfer subsystem 136 may transfer portions of a third heat load 142 (e.g., an external heat load radiating from a solar source throughout the floodlight, 102) at a third rate (e.g., $q_s$).

The floodlight 102 (e.g., the combination of instrumentation and the heat-transfer subsystems as described above, and as governed by thermal-control manager application 124) may perform one or more active thermal-control operations. An example active thermal-control operation includes determining, based on temperature readings from one or more thermistors (e.g., the first PSU thermistor 126, the second PSU thermistor 128, the PIR thermistor 130, the MCU thermistor 132), a temperature profile of the floodlight 102. Based on the temperature profile and heat-transfer characteristics of the floodlight 102 (e.g., the LED heat-transfer subsystem 134 and the PSU heat-transfer subsystem 136), the thermal-control manager application 124 may adjust (e.g., reduce, shut down) power from the first PSU 112 and/or the second PSU 114.

Adjusting the power may be effective for the floodlight 102 to maintain any combination of (i) a first temperature of a first thermal zone including the first PSU 112 at or below a first prescribed temperature threshold, (ii) a second temperature of a second thermal zone that includes the second PSU 114 at or below a second prescribed temperature threshold, (iii) a third temperature of a third thermal zone that includes the PIR sensor 116 at or below a third prescribed temperature threshold, and (iv) a fourth temperature of a fourth thermal zone that includes the MCU 120 at or below a fourth temperature threshold. In some instances, reducing the power may contribute to dimming of the LED array 106.

In general, the floodlight 102 may include multiple instances of the LED array 106 and multiple instances of the LED housing component 104. In general, and to maintain equilibrium, a rate of floodlight heat dissipation 144 is the sum of the rates of heat dissipated from the main housing component 108 and the instances of the LED housing component 104/LED array 106 (e.g., $q_d = q_s + q_{i,m} + [n \times q_{i,l}]$, where n is a quantity of instances of the LED array 106 and the LED housing component 104).

Figure 2:
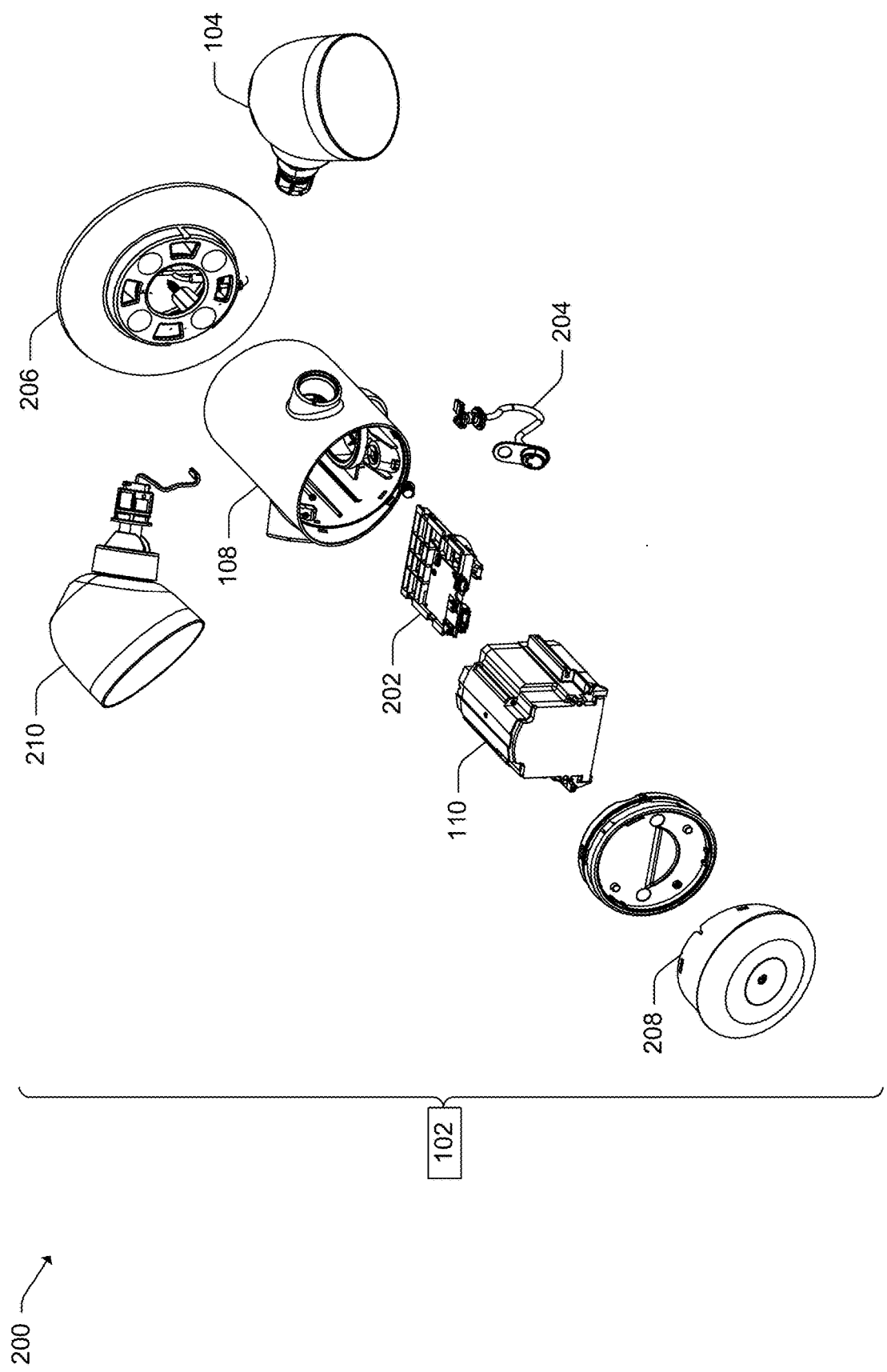
FIG. 2 illustrates an exploded, isometric view of a floodlight in accordance with one or more aspects.

FIG. 2 illustrates an exploded, isometric view 200 of the floodlight 102 of FIG. 1. As illustrated, FIG. 2 includes the LED housing component 104 (including the LED array 106 and the LED heat-transfer subsystem 134 of FIG. 1), the main housing component 108, the PSU subsystem 110 (including the first PSU 112 and the second PSU 114, and the PSU heat-transfer subsystem 136 of FIG. 1).

FIG. 2 also illustrates additional aspects of the floodlight 102, including a main PCB 202 that is populated with one or more integrated circuit (IC) devices (e.g., the MCU 120 and the CRM 122 of FIG. 1, as well as other IC devices that control the PIR sensor 116 of FIG. 1). The floodlight 102 may include one or more pogo pin cable(s) 204 to conduct power within the LED floodlight 102 (e.g., power from the PSU subsystem 110 to the LED array 106).

The floodlight 102 may also include one or more covers or plates, such as trim plate 206 and front cover 208. Additional housing components, such as a second LED housing component 210 (e.g., which may be a second instance of the LED housing component 104, including the LED array 106 of FIG. 1), may also be included in the floodlight 102.

Figure 3:
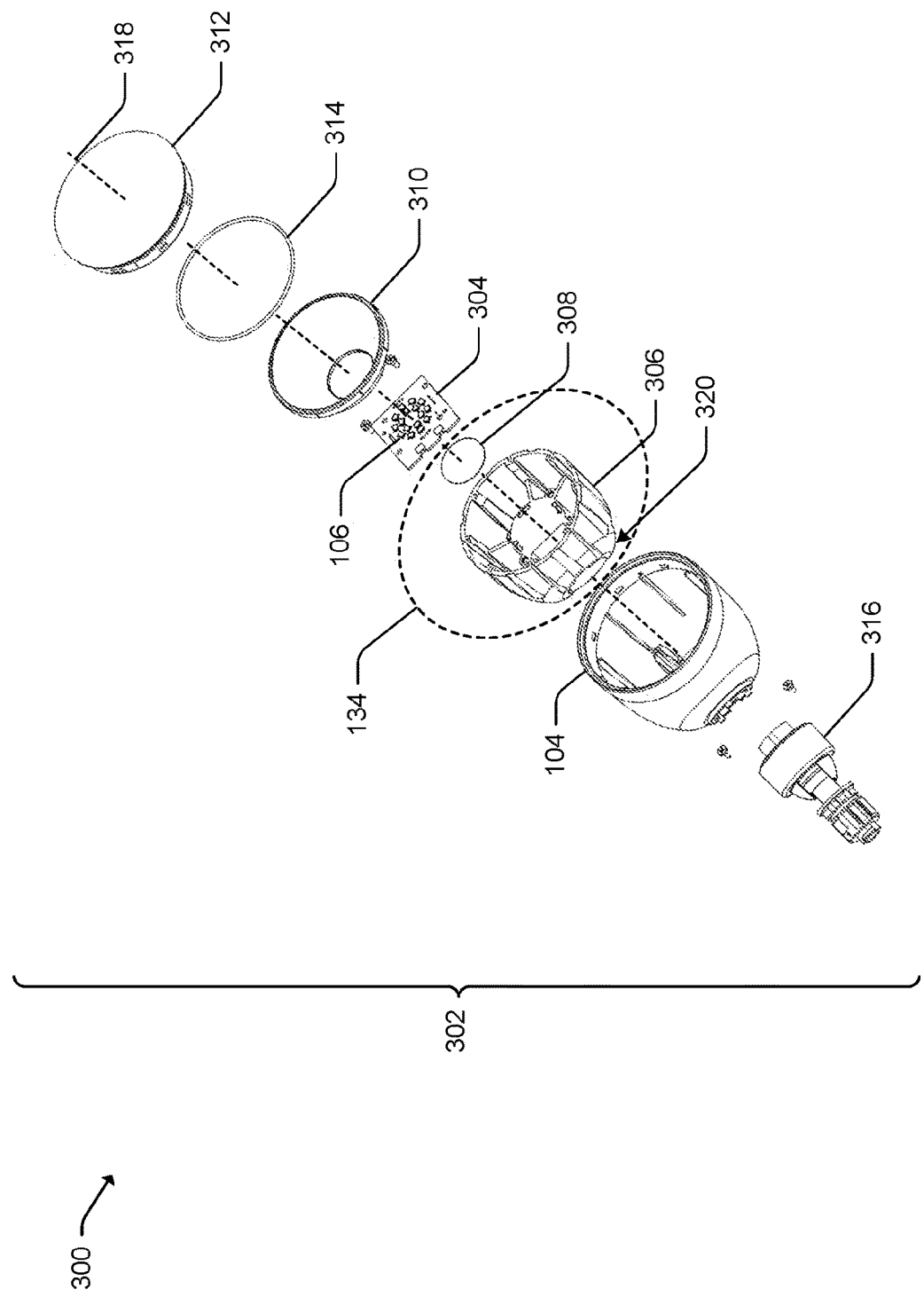
FIG. 3 illustrates an exploded, isometric view of an LED-light subassembly of a floodlight in accordance with one or more aspects.

FIG. 3 illustrates an exploded, isometric view 300 of an LED-light subassembly 302 of a floodlight. The LED-light subassembly 302 may include features of FIG. 1, including the LED housing component 104, the LED array 106, and the LED heat-transfer subsystem 134.

The LED array 106 may include at least one LED. For example, the LED array 106 may include a gallium-nitride on silicon (GaN-on-Si) LED, an organic LED (OLED), or any other suitable LED. In some instances, each LED of the LED array 106 may be a bare die or packaged surface mount (SMT) package component that is mounted to an LED PCB 304.

The LED heat-transfer subsystem 134 includes a heat sink 306 and a TIM 308. The heat sink 306 may be shaped as a substantially-cylindrical shell with a rounded cap 320 that fits inside the LED housing component 104. The heat sink 306 may also include a metal material such as aluminum. The TIM 308 may include a thermal gel material, a thermal grease material, a thermal pad material, and so on. The TIM 308 may be located between the LED PCB 304 and an inner surface of the heat sink 306 to transfer, using a conduction heat-transfer mechanism, heat from the LED PCB 304 to the heat sink 306. The heat sink 306 may, in turn, transfer heat to the LED housing component 104 using one or more of a conduction, convection, or radiation heat-transfer mechanism.

In some instances, and after assembly, the LED housing component 104 (along with the lens 312) may fully enclose the heat sink 306. In such instances, direct access to the heat sink 306 is prevented.

The LED-light subassembly 302 may include additional elements such as a reflector 310, a lens 312, and a lens o-ring 314. In some instances, the reflector 310 may include features that improve radiation heat-transfer (e.g., a thin layer of a polyethylene terephthalate (PET) film).

In general, elements of the LED-light subassembly 302 (e.g., the LED housing component 104, the heat sink 306, the reflector 310, the lens 312, and the lens o-ring 314) may be radially symmetric about a central axis 318 and positioned coaxially with the central axis 318. The LED PCB 304 may be located within a generally planar region that is substantially orthogonal to the central axis 318.

The LED-light subassembly 302 may also include a mount 316 for coupling the LED-light subassembly 302 with another portion of the floodlight (e.g., the main housing component 108 of FIG. 1). The mount 316 may be any suitable mount, including a fixed mount, a swivel mount, and so on. In some instances, the mount 316 may be made from an aluminum material and include features that improve convection heat-transfer (e.g., fins).

Figure 4:
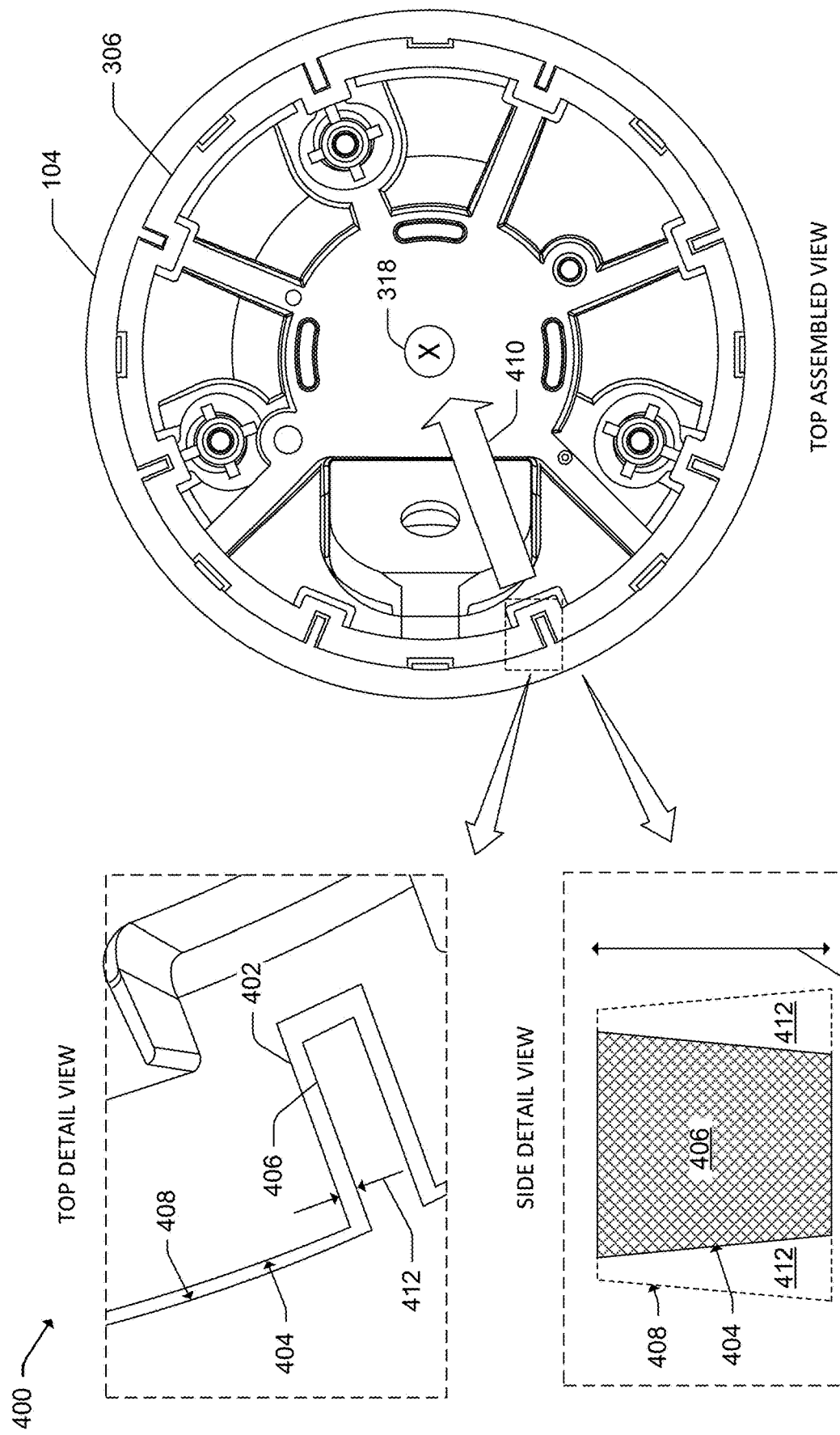
FIG. 4 illustrates details of a heat sink located within a housing component of the LED-light subassembly from FIG. 3 in accordance with one or more aspects.

FIG. 4 illustrates details 400 of a heat sink located within a housing component of the LED-light subassembly from FIG. 3 in accordance with one or more aspects.

As illustrated by the top detail view in FIG. 4, the heat sink 306 includes at least one channel 402 that recesses from an outer surface 404 of the heat sink 306, while the LED housing component 104 includes at least one rib 406 that protrudes from an inner surface 408 of the LED housing component 104. The rib 406, in general, may protrude in a direction 410 that is radially inwards towards the central axis 318. In general, and during assembly of the heat sink 306 into the LED housing component 104, one or more of the channel 402 and the rib 406 may perform complementary mechanical alignment functions (e.g., the channel 402 may receive the rib 406). The channel 402 and the rib 406 may be separated by a gap 412.

The rib 406 as illustrated by the side detail view in FIG. 4 (not to scale), may be fabricated such that a width 414 of the gap 412 tapers along a length 416 of the rib 406 (the channel 402 and the rib 406 may each run generally parallel, lengthwise, to the central axis 318). For example, at a first end (e.g., a bottom end) of the channel 402 and the rib 406, the gap 412 may measure approximately 0.30 millimeters (mm), while at a second end (e.g., a top, opposite end), the gap 412 may measure approximately 0.08 mm.

The tapering of the width 414 may be resultant from combinations of angles used to fabricate the channel 402 and the rib 406. In some instances, and as illustrated in the side detail view, angles associated with the outer surface 404 and the inner surface 408 may mirror one another in a complementary fashion. In other instances, angles associated with the outer surface 404 and the inner surface 408 may differ.

The tapering of the gap 412 may aid in insertion of the heat sink 306 into the LED housing component 104. For example, a larger gap at the first end of the channel 402 and the rib 406 may enable coarse alignment for initial, ease of positioning of the heat sink 306 in relation to the LED housing component 104. As the heat sink 306 slides into the LED housing component 104, a smaller gap at the second end of the channel 402 and the rib 406 may enable fine alignment to place outer surface regions of the heat sink 306 in physical contact with inner surface regions of the LED housing component 104. This fine alignment may improve conduction heat-transfer from the heat sink 306 to the LED housing component 104.

Figure 5:
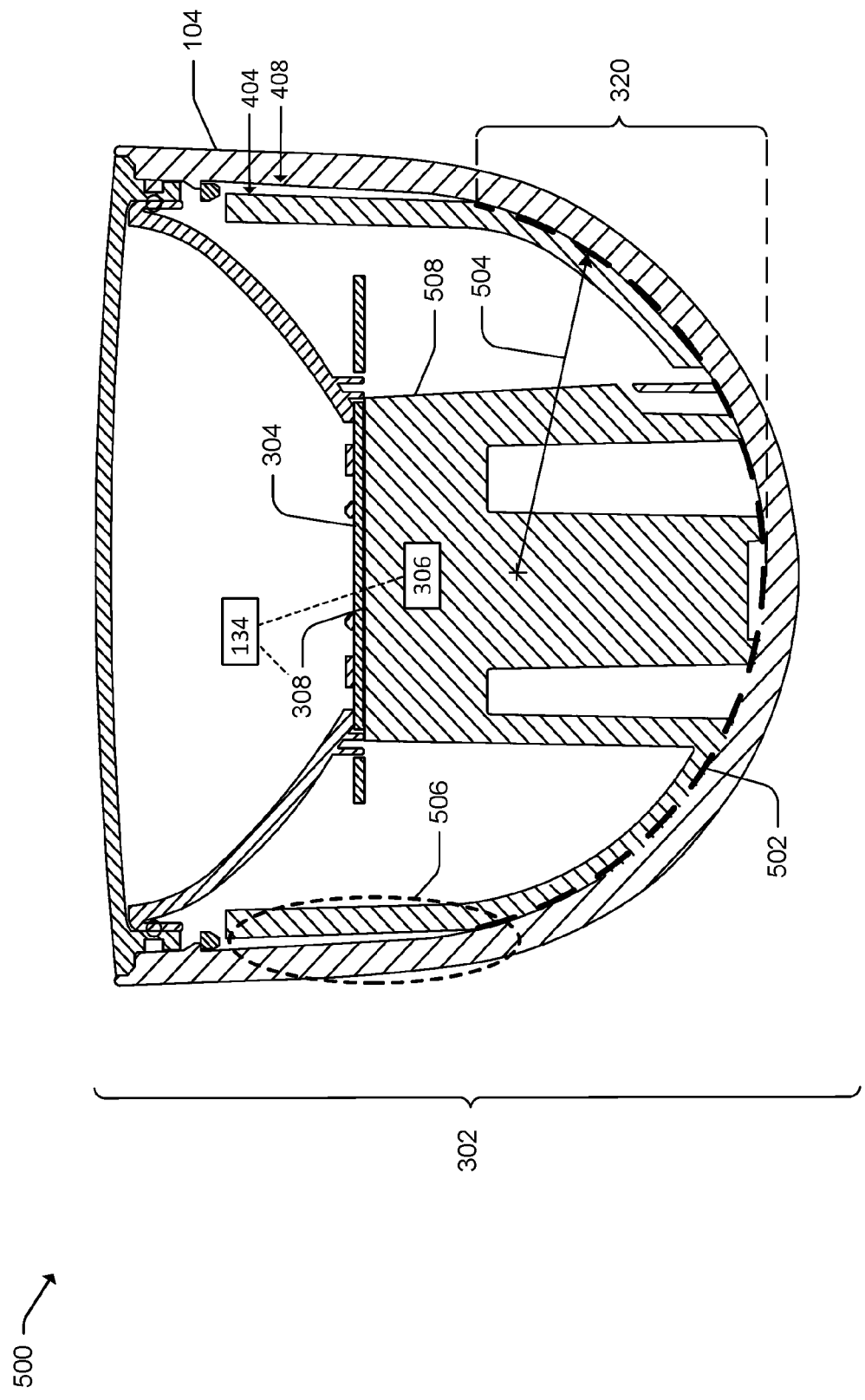
FIG. 5 illustrates a side, section view of the LED-light subassembly from FIG. 3 in accordance with one or more aspects.

FIG. 5 illustrates a side, section view 500 of the LED-light subassembly 302 from FIG. 3 in accordance with one or more aspects. As illustrated, the TIM 308 is located between the LED PCB 304 and a pedestal region 508 of the heat sink 306. With this arrangement, the LED PCB 304 may transfer heat (e.g., heat from the LED array 106 of FIGS. 1 and 3) through the TIM 308 and to the heat sink 306 using a conduction heat-transfer mechanism. In general, the TIM 308 reduces air gaps between the LED PCB 304 and the heat sink 306, improving efficacy of the conductive heat-transfer mechanism between the LED PCB 304 and the heat sink 306.

In FIG. 5, corresponding regions of the outer surface 404 (e.g., rounded cap 320) and the inner surface 408 are in physical contact (e.g., in physical contact at interface region 502, illustrated by a broken line). The interface region 502 may be defined by a three-dimensional radius of curvature 504, which, in some instances, may be variable in magnitude. In some instances, the interface region 502 may be such that approximately 80% or more of the outer surface 404 is in physical contact with the inner surface 408 (e.g., at least 80% of available surface area, in $mm^2$, from the outer surface 404 is in physical contact with the inner surface 408). Efficacy of conductive heat-transfer from the heat sink 306 to the LED housing component 104 may scale as this percentage changes.

There may, in some instances, be gap region(s) 506 between the outer surface 404 and the inner surface 408. In such instances, the heat sink 306 may further transfer heat to the LED housing component 104 using convection and/or radiation heat-transfer mechanisms.

Figure 6:
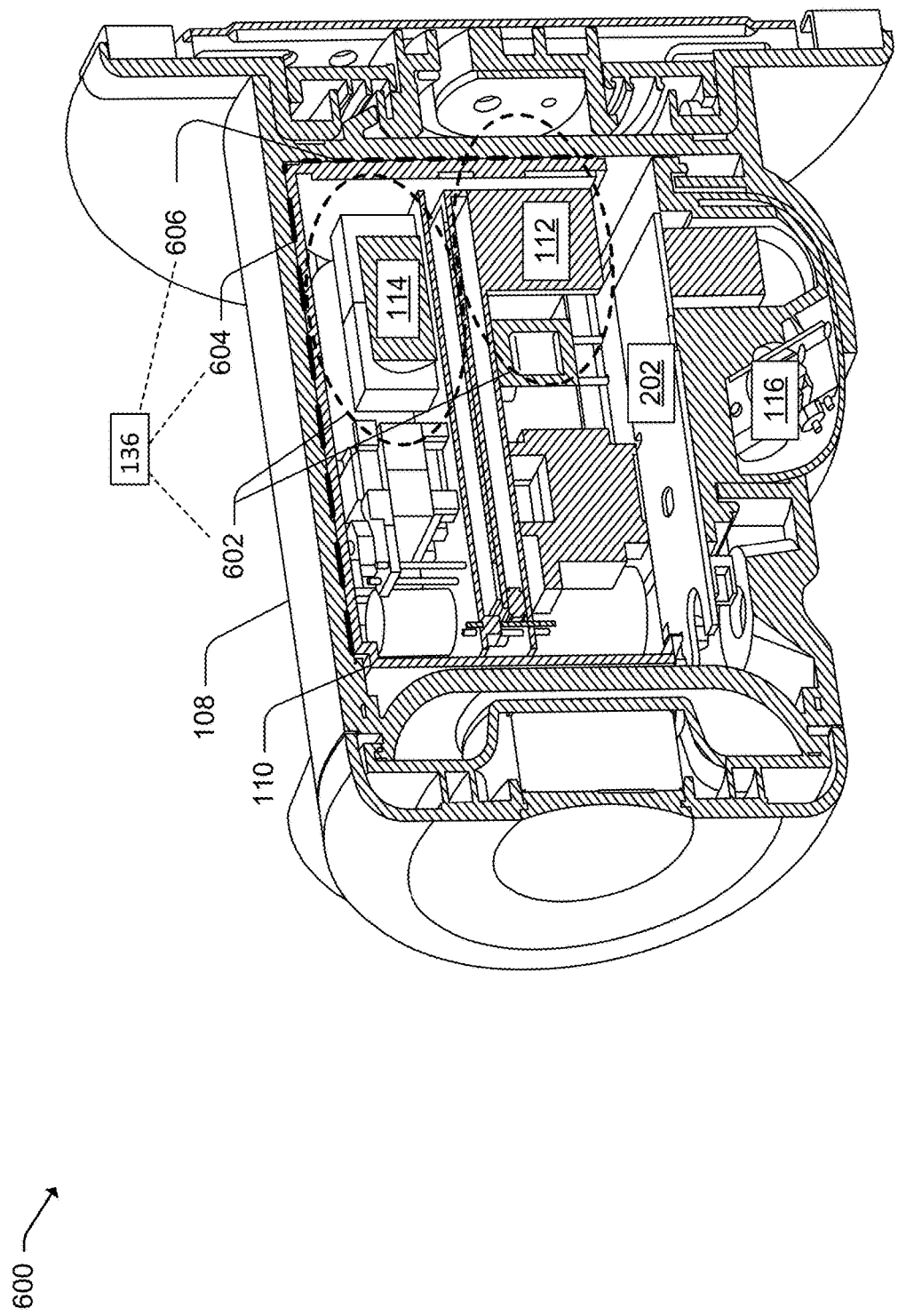
FIG. 6 illustrates an isometric, section view of a main housing component of the floodlight from FIGS. 1 and 2 in accordance with one or more aspects.

FIG. 6 illustrates an isometric, section view 600 of a main housing component of the floodlight from FIGS. 1 and 2 in accordance with one or more aspects. The section view includes the main housing component 108, the PSU subsystem 110 (including the first PSU 112 and the second PSU 114), the PSU heat-transfer subsystem 136, the PIR sensor 116, and the main PCB 202.

The PSU heat-transfer subsystem 136 may include several features, including a glue-potting material 602 (e.g., regions for the glue-potting material are highlighted with broken lines) that envelops the first PSU 112 and/or the second PSU 114. The glue-potting material 602 may alleviate air pockets within the PSU subsystem 110 and improve thermal conductivity from the first PSU 112 and/or the second PSU 114 to an interior wall of the PSU subsystem 110.

Other features of the PSU heat-transfer subsystem 136 may include an air gap 604 (e.g., represented by a broken line) and/or a TIM 606 (represented by another broken line). The PSU subsystem 110 may transfer heat to the main housing component 108 by way of convection and/or radiation heat-transfer mechanisms using the air gap 604. The PSU subsystem 110 may also transfer heat to the main housing component 108 by way of a conduction heat-transfer mechanism using the TIM 606. In some instances, the TIM 606 may include a thermal pad material.

Figure 7:
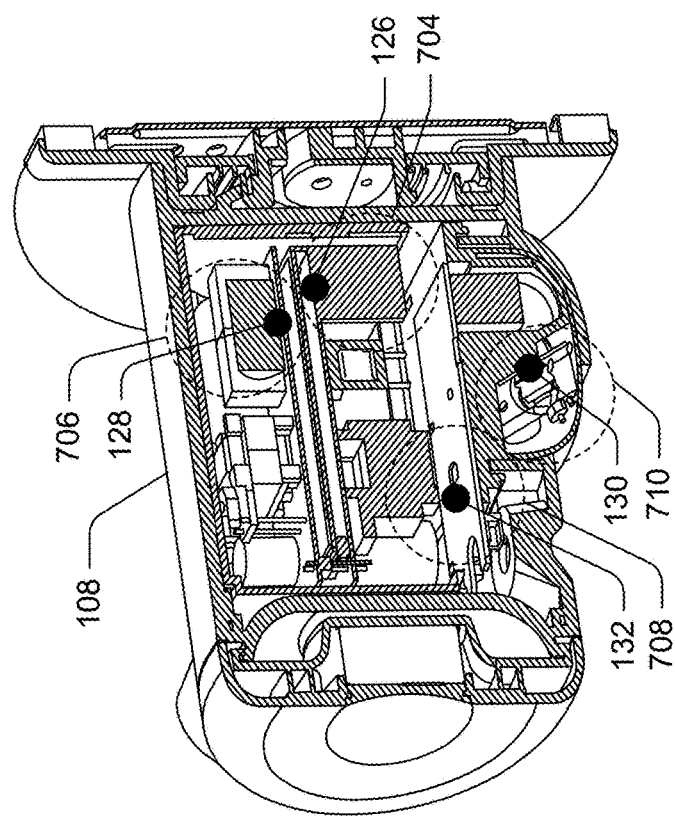
FIG. 7 illustrates example details of multiple thermal zones within the main housing component of the floodlight from FIG. 2 that are controlled by a thermal-control manager application in accordance with one or more aspects.

FIG. 7 illustrates example details of multiple thermal zones within the main housing component of the floodlight from FIG. 2 that are controlled by a thermal-control manager application in accordance with one or more aspects (e.g., the MCU 120 of FIG. 1 executing the thermal-control manager application 124). FIG. 7 also illustrates approximate locations of the first PSU thermistor 126, the second PSU thermistor 128, the PIR thermistor 130, and the MCU thermistor 132 of FIG. 1. The thermistors may each measure a temperature of a respective thermal zone.

In general, heat-transfer characteristics of a floodlight (e.g., the floodlight 102 of FIG. 1) may be characterized through a combination of thermal modeling and measurements in a lab environment. The heat-transfer characteristics within a region, such as effective thermal resistance, may be based on (i) heat loads originating from within the floodlight (e.g., power dissipated from one or more power supplies, such as the second heat load 140 of FIG. 1), (ii) a heat load originating external to the floodlight (e.g., heat radiated from a solar source, such as a portion of the third heat load 142 of FIG. 1), and (iii) characteristics of a heat-transfer subsystem within the region (e.g., the PSU heat-transfer subsystem 136 of FIG. 1). The heat-transfer characteristics may further be based on an ambient temperature condition surrounding the floodlight.

In some instances, the heat-transfer characteristics of a region may be influenced by factors that are not local to the region (e.g., the LED heat-transfer subsystem 134 of FIG. 1 and/or wiring within the floodlight 102 of FIG. 1 may have concomitant effects on the PSU heat-transfer subsystem 136 of FIG. 1).

In some instances, a desired temperature profile of one or more portions of the floodlight may be dependent on a given scenario. FIG. 7 illustrates a table 702, which includes an example of a desired temperature profile of elements within the main housing component 108 for different dimming conditions (e.g., scenarios), including a shutdown condition. FIG. 7 also illustrates, on the right-hand side, example thermal zones corresponding to thermistor locations within the main housing component 108. A thermistor may be embedded into a PCB to which a corresponding device is mounted or, in some instances, incorporated into the device itself.

The floodlight (e.g., the MCU 120 of FIG. 1 executing the thermal-control manager application 124 of FIG. 1) may, in general, actively control its temperature profile based temperature readings from one or more of the thermistors and heat-transfer characteristics of one or more heat-transfer subsystems (e.g., heat-transfer characteristics of the LED heat-transfer subsystem 134 and/or the PSU heat-transfer subsystem 136). If one or more thresholds are exceeded, the floodlight may adjust (e.g., reduce or shutdown) power supplied by one or more of its PSUs (e.g., the first PSU 112 and/or the second PSU 114).

The multiple thermal zones may include a first thermal zone 704, including the first PSU thermistor 126. The first thermal zone 704 may have a first prescribed temperature threshold corresponding to a maximum allowable temperature of a first PSU (e.g., the first PSU 112 of FIG. 1).

As an example, the first prescribed temperature threshold may correspond to a shutdown threshold of approximately 103° C. A heat-transfer system (e.g., the PSU heat-transfer subsystem 136 of FIG. 1, and in some ancillary instances, the LED heat-transfer subsystem 134 of FIG. 1) may spread and dissipate heat throughout the floodlight to maintain the first thermal zone 704 at or below the first prescribed temperature threshold (e.g., a temperature measured by the first PSU thermistor 126 may be maintained at or below 103° C. under all thermal-loading conditions). In the event the first prescribed temperature threshold is exceeded, the floodlight may adjust (e.g., shutdown) power supplied by one or more of its PSUs.

The multiple thermal zones may also include a second thermal zone 706, including the second PSU thermistor 128. The second thermal zone 706 may have a second prescribed temperature threshold corresponding to a maximum allowable temperature of a second PSU (e.g., the second PSU 114 of FIG. 1).

For example, the second prescribed temperature threshold may correspond to a shutdown threshold of approximately 103° C. A heat-transfer system may spread and dissipate heat throughout the floodlight to maintain the second thermal zone 706 at or below the second prescribed temperature threshold. In the event the second prescribed temperature threshold is exceeded, the floodlight may adjust (e.g., shutdown) power supplied by one or more of its PSUs.

The multiple thermal zones may also include a third thermal zone 708, including the MCU thermistor 132. The third thermal zone may have a third prescribed temperature threshold corresponding to a maximum allowable temperature of a junction temperature of an MCU (e.g., the MCU 120 of FIG. 1).

For instance, the third prescribed temperature threshold may be variable based on an operating condition of the floodlight (e.g., dimming of the LED array 106). The third prescribed temperature threshold may correspond to a junction temperature of approximately 75° C. for a 50% dimming condition or a junction temperature of approximately 77° C. for a 10% dimming condition. The heat-transfer system may spread and dissipate heat throughout the floodlight to maintain the third thermal zone 708 at or below the third prescribed temperature threshold. In the event the third prescribed temperature threshold is exceeded, the floodlight may adjust (e.g., reduce) power supplied by one or more of its PSUs.

The multiple thermal zones may also include a fourth thermal zone 710, including the PIR thermistor 130. The fourth thermal zone may have a fourth prescribed temperature threshold corresponding to a maximum allowable temperature of a junction temperature of a PIR sensor (e.g., the PIR sensor 116 of FIG. 1).

For instance, the fourth prescribed temperature threshold may be variable based on an operating condition of the floodlight (e.g., the dimming of the LED array). The fourth prescribed temperature threshold may correspond to a junction temperature of approximately 61° C. for a 50% operating condition or a junction temperature of approximately 63° C. for a 10% operating condition. The heat-transfer system may spread and dissipate heat throughout the floodlight 102 to maintain the fourth thermal zone 710 at or below the fourth prescribed temperature threshold. In the event the fourth prescribed temperature threshold is exceeded, the floodlight may adjust (e.g., reduce) power supplied by one or more of its PSUs.

In general, the floodlight may include additional instrumentation to control additional thermal zones (e.g., the LED-light subassembly 302 of FIG. 3 may include additional thermistors to monitor other thermal zones). The floodlight may also use other techniques (e.g., the MCU 120 of FIG. 1 may measure forward voltages of the LED array 106, which may correspond to junction temperatures of LEDs within the LED array 106).

Although techniques using and apparatuses for active thermal-control of a floodlight and associated floodlights are described, it is to be understood that the subject of the appended claims is not necessarily limited to the specific features or methods described. Rather, the specific features and methods are disclosed as example ways in which active thermal-control of a floodlight and associated floodlights can be implemented.

What is claimed is:

1. A floodlight comprising:
   a first housing component shaped as a first substantially-cylindrical shell with a rounded cap and having a central axis, the first housing component including a first region of an inner surface having a three-dimensional curvature;
   an array of light-emitting diodes mounted to a printed circuit board that is internal to the first housing component, the printed circuit board positioned within a planar area that is generally orthogonal to the central axis; and
   a first heat-transfer subsystem located within the first housing component and configured to transfer first heat from the array of light-emitting diodes to the first housing component for external dissipation, the first heat-transfer subsystem comprising:
      a heat sink shaped as a second substantially-cylindrical shell with a rounded cap forming a cup shape, the heat sink positioned coaxially with the central axis of the first housing component, the heat sink fitting within the first housing component and having a second region of an outer surface approximating the three-dimensional curvature that is in physical contact with the first region of the inner surface, the second region of the outer surface enabling conductive heat transfer to the first housing component through the physical contact with the first region of the inner surface; and
      a thermal interface material, the thermal interface material located between the printed circuit board and a pedestal region of the heat sink.

2. The floodlight as recited by claim 1, wherein:
   the inner surface of the first housing component includes at least one rib that protrudes from the inner surface of the first housing component toward the central axis, the rib having a length that traverses the inner surface in a direction that is generally parallel to the central axis; and
   the outer surface of the heat sink includes a recessed region that is complementary to the rib.

3. The floodlight as recited by claim 2, wherein a width of the rib tapers along the length of the rib.

4. The floodlight as recited by claim 3, wherein the second region is approximately eighty percent or more of an available surface area of the outer surface.

5. The floodlight as recited by claim 1, wherein the first housing component includes a post-consumer resin material.

6. The floodlight as recited by claim 1, wherein the thermal interface material includes a thermal gel material.

7. The floodlight as recited by claim 1, wherein the first housing component forms a general cup shape with a substantially cylindrical shell having an open end and an opposing, round closed end, fully enclosing the heat sink shaped as a second substantially-cylindrical shell with a rounded cap forming a cup shape that fits within the first housing component.

8. The floodlight as recited by claim 1, wherein the array of light-emitting diodes includes one or more of a gallium-nitride on silicon light-emitting diode or an organic light-emitting diode.

9. The floodlight as recited by claim 1, further comprising:
   a camera;
   a second housing component that houses a power supply system that provides power to the array of light-emitting diodes and the camera; and
   a second heat-transfer subsystem that is configured to transfer second heat from the power supply system to the second housing component for external dissipation.

10. The floodlight as recited by claim 9, wherein:
    the power supply system includes:
       a first power supply that supplies a first amount of power to the array of light-emitting diodes; and
       a second power supply that supplies a second amount of power to the camera; and
    the second heat-transfer subsystem includes:
       a glue potting-material that envelops the first power supply and the second power supply.

11. A floodlight comprising:
    an array of light-emitting diodes;
    a first heat-transfer subsystem to transfer heat from the array of light-emitting diodes to a first housing component containing the array of light-emitting diodes;
    a passive infrared sensor;
    a microcontroller;
    a power supply system comprising:
       a first power supply unit, the first power supply unit configured to supply a first amount of power to the array of light-emitting diodes; and
       a second power supply unit, the second power supply unit configured to supply a second amount of power to the passive infrared sensor;
    a second heat-transfer subsystem to transfer heat from the power supply system to a second housing component that contains the power supply system;
    one or more thermistors located within thermal zones of the second housing component; and
    a computer-readable storage medium storing instructions of a thermal-control manager application that, upon execution by the microcontroller, directs the floodlight to:
       determine, based on temperature readings from the one or more thermistors, a temperature profile of the floodlight; and
       adjust, based on the temperature profile and heat-transfer characteristics of one or more of the first and second heat-transfer subsystems, power supplied by the power supply system to concurrently maintain:
          a first temperature of a first thermal zone at below a first prescribed temperature threshold, the first thermal zone including the first power supply unit; and
          a second temperature of a second thermal zone at or below a second prescribed temperature threshold, the second thermal zone including the second power supply unit.

12. The floodlight as recited in claim 11, wherein adjusting the power supplied by the power supply system further concurrently maintains:
    a third temperature of a third thermal zone at below a third prescribed temperature threshold, the third thermal zone including the passive infrared sensor; and
    a fourth temperature of a fourth thermal zone at or below a fourth prescribed temperature threshold, the fourth thermal zone including the microcontroller.

13. The floodlight as recited by claim 12, wherein adjusting power supplied by the power supply system includes adjusting the first amount of power supplied by the first power supply unit.

14. The floodlight as recited by claim 13, wherein adjusting the power supplied by the power supply system includes adjusting the second amount of power supplied by the second power supply unit.

15. The floodlight as recited by claim 11, wherein the first heat-transfer subsystem includes a heat sink that is fully enclosed by the first housing component.

16. The floodlight as recited by claim 15, wherein the heat sink is shaped as a substantially-cylindrical shell with a rounded cap.

17. The floodlight as recited by claim 16, wherein:
at least a second region of an outer surface of the heat sink approximates a three-dimensional curvature of a first region of an inner surface of the first housing component; and
the second region of the outer surface is in physical contact with the first region of the inner surface.

18. The floodlight as recited by claim 17, wherein:
the first housing component includes at least one rib that protrudes from the inner surface towards a central axis of the first housing component; and
the outer surface of the heat sink includes a complementary, recessed region configured to receive the rib and align the heat sink to the first housing component.

19. The floodlight as recited by claim 18, wherein the first heat-transfer subsystem further includes a thermal interface material that is located between the heat sink and a printed circuit board to which the array of light-emitting diodes is mounted.

20. The floodlight as recited by claim 11, wherein the second heat-transfer subsystem includes a glue potting-material that envelops the first power supply unit and the second power supply unit.

* * * * *